Feb. 21, 1956 J. R. TALLMAN 2,735,175
ALUMINUM CABLE CUTTER
Filed Dec. 15, 1954
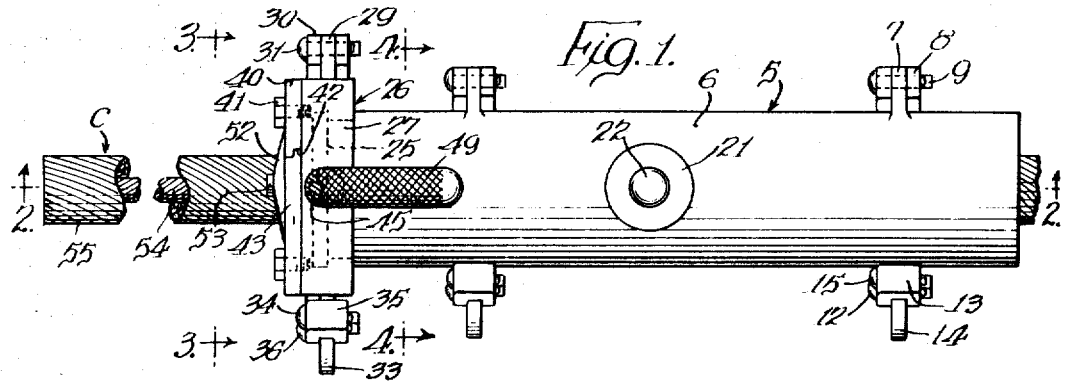
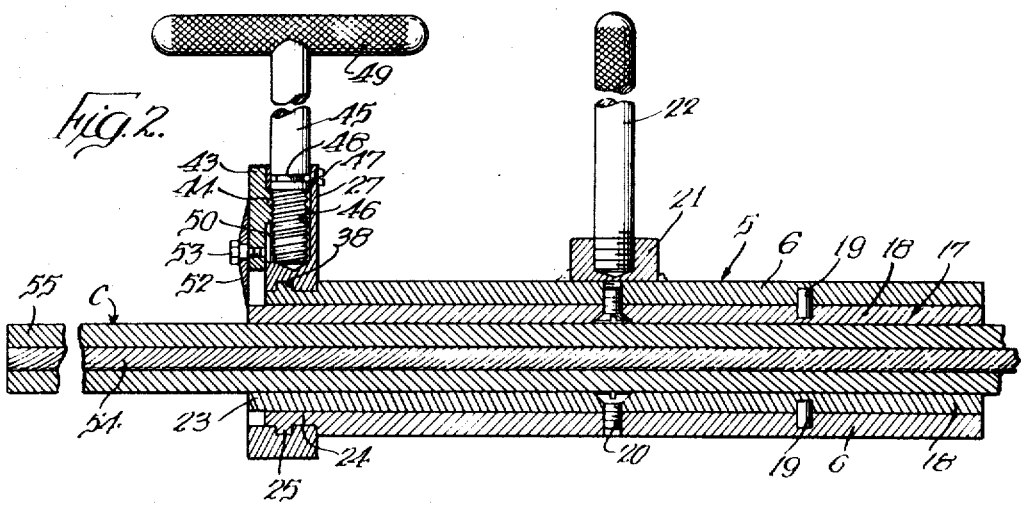
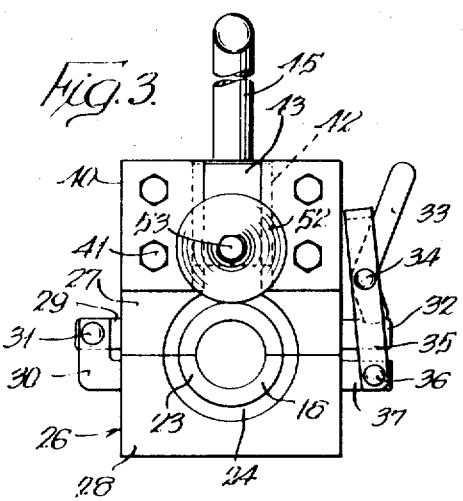
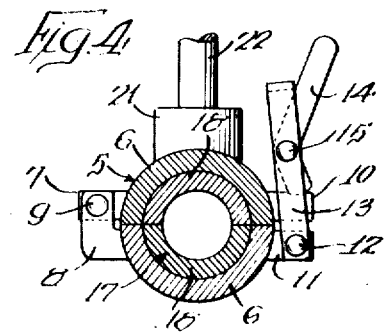
INVENTOR.
John R. Tallman

United States Patent Office 2,735,175
Patented Feb. 21, 1956

2,735,175

ALUMINUM CABLE CUTTER

John R. Tallman, Chicago, Ill.

Application December 15, 1954, Serial No. 475,439

4 Claims. (Cl. 30—91)

This invention relates to cutting tools, and has to do with a tool for cutting stranded aluminum conductor cable for splicing thereof, and analogous purposes.

Aluminum cable to be used in high tension electric lines is given a smooth and highly polished finish. Any defects in the cable, such as scratches or roughness, produces a strong corona effect when the cable is energized with resultant loss of energy and serious electric and magnetic interference with telephone, telegraph, radio and television on communication networks. It is important, therefore, that such defects be remedied. That is usually done by cutting out the defective portion of the cable and splicing together the cut ends. In order to make the splice, the cable is cut completely through, including the steel core, and the stranded aluminum cover is removed for a suitable distance, approximately six inches or more from each end of the cut cable, to expose the steel reinforcing core. A thick walled aluminum sleeve is then slid over one of the cable ends, the exposed ends of the steel reinforcing core are inserted into a steel sleeve of a wall thickness the same as the thickness of the aluminum covering of the cable, with the ends of the core fitting snugly in the sleeve and the ends of the latter abutting the aluminum covering on the cable ends, and the sleeve is compressed tightly about the core ends under appropriately high pressure, splicing them together. The aluminum sleeve is then slid over the steel splicing sleeve, being of a length to extend a substantial distance beyond each end thereof, and is compressed about the steel sleeve and the aluminum covering of the cable ends, the ends of the aluminum sleeve being suitably tapered and finished to avoid any objectionable projections or sharp edges, thus completing the splice.

The splicing operation as above outlined is performed in the field. It is important that in cutting and removing the aluminum covering of the cable ends scratching or scoring of the steel reinforcing core, which usually is stranded and constitutes the strength element of the cable, be avoided, because such scratching or scoring would produce an incipient weakness or flaw which would result in failure or breakage of the core and the cable. My invention has to do with a tool by means of which the aluminum covering of a cable end may be cut with expedition and facility for substantially the full thickness thereof but with assurance of avoidance of scratching, cutting or other injury to the steel core of the cable by the cutting element. To that end I provide a sleeve structure which may be clamped about the cable end and has associated therewith relatively rotatable means carrying a cutting member adjustable radially of the cable end, and means positively limiting inward radial travel of the cutting member in a manner assuring that it will cut almost, but not quite, completely through the aluminum covering of the cable end and will not contact the steel core of the cable. The means for limiting inward movement of the cutting member is removable and replaceable so as to adapt the tool for use with cables having standard aluminum coverings of widely varying thicknesses. The means for adjusting the cutting member also provides a handle for rotating that member about the cable end to be cut, and the sleeve structure conveniently is also provided with a handle for holding it against turning during the cutting operation. Further objects and advantages of my invention will appear from the detail description.

In the drawings:

Figure 1 is a plan view of a cable cutter embodying my invention, applied to a cable end;

Figure 2 is a sectional view taken substantially on line 2—2 of Figure 1, certain parts being shown in elevation;

Figure 3 is an end view of the cable cutter of Figure 1 taken substantially on line 3—3 thereof, the cable being omitted; and Figure 4 is a sectional view taken substantially on line 4—4 of Figure 1, the cable being omitted.

The cable cutter of my invention comprises a split sleeve 5 consisting of two semi-cylindrical members 6 hinged together at one side of sleeve 5, at two points adjacent the ends thereof, by means of lugs 7 extending from one of the sections 6 between L-shaped lugs 8 extending from the other section 6, the lugs 7 and 8 being pivotally connected by a pin 9 passed therethrough. At the other side of sleeve 5 the upper section 6 is provided with two outwardly extending lugs 10 and the lower section is provided with two outwardly extending lugs 11 on each of which is pivoted, by a pin 12, a clevis 13 of elongated inverted U-shape. A cam lever 14 is pivoted at 15 in clevis 13 and when the latter is in its operative position extending about lug 10, is disposed for camming engagement with the latter lug. That provides means whereby the two sections 6 of sleeve 5 may be forced toward each other and locked closed. The sleeve 5 preferably is of substantial length, twelve inches or more, to assure that the cable end to be cut will be maintained straight lengthwise during the cutting operation, which is conducive to accuracy thereof. The clevis and cam lever means shown is desirable as providing quick acting means for clamping the clamp structure, comprising the sleeve 5 and associated parts, about the cable 10 and readily releasing it therefrom, but within the broader aspects of my invention any suitable means may be provided for clamping the clamp structure about the cable end.

The sleeve 5 is provided with a liner 17 comprising two semi-cylindrical sections 18 fitting within the sleeve 5 and, at one end, flush with one end of the sleeve. A stud 19 is secured in each section 6 of sleeve 5 and fits snugly into a corresponding recess in the corresponding liner section 18, thereby assuring proper positioning thereof relative to its sleeve section 6. Each of the liner sections 18 is removably secured in the corresponding sleeve section 6 by means of a screw 20 passing through liner section 18 and threading into the sleeve section 6, the head of the screw being countersunk in the liner section so as to clear the cylindrical passage defined between the sections of the liner when the clamp structure, comprising the sleeve and the liner, is closed. A block or pad 21 is suitably secured, conveniently by welding, to one of the sleeve sections—the upper one as shown in the drawings—and has threaded therein the lower or inner end portion of the rod 22 which is knurled for a suitable extent of its length, to provide a handle for holding the clamp structure against turning during the cutting operation, as will be explained more fully presently. The liner sections 18 are of somewhat greater length than the sleeve sections 6, to provide an extension 23 in the form of a hollow cylinder or annular shoulder which projects outward beyond the other end of sleeve 5. The end portion 24 of each sleeve section 6 adjacent the extension 23 of the liner is of reduced wall thickness, as shown in Figure 2, and is provided with an outwardly projecting circumferential rib 25. A cutter head 26 is rotatably mounted on the reduced end portion 24 of sleeve 5. The head 26 comprises an upper section, as shown in the drawings, and a lower section, 27 and 28, respectively. The upper section 27 is provided, at one side thereof, with an outwardly extending lug 29 which fits between two lugs 30 of substantially L-shape projecting from the lower section 28, the lugs 29 and 30 being pivoted together by a pin 31 passing therethrough. The upper section 27 of head 26 is provided, at its other side, with an outwardly projecting lug 32 which cooperates with a cam lever 33 pivoted at 34 in a clevis 35 pivoted at 36 on a lug 37 projecting from the lower section 28, for clamping the sections 27 and 28 of head 26 closed, in the same manner as the clamp sleeve structure is secured closed. Each section 27 and 28 of head 26 is provided with an interior groove 38 which receives rib 25, providing a tongue and groove connection between the sleeve 5 and head 26 effective for restraining them against relative axial movement. The head 26 when clamped upon the sleeve 5 fits snugly, but not tightly, thereon so as to turn freely thereabout.

Two guide strips 40 are suitably secured, conveniently by cap screws 41, to the outer face of the upper section 27 of head 26, adjacent the sides thereof. The inner edge portions of the guide strips 40 are rabbeted from their inner faces to provide guideways which slidably receive flanges 42 extending from the sides of a cutter mounting plate 43 of substantial thickness disposed between the guide strips 40. Plate 43 is provided at its inner face with a thickened element 44 which is threaded for engagement with an adjusting screw 45 rotatably mounted in the upper section 27 of head 26 and extending upward therefrom. The inner end of screw 45 seats against the inner end of bore 46 in head section 27, which bore receives the screw, and screw 45 is restrained against outward movement by a dog pointed screw 47 threaded into head section 27 with its point engaging into a circumferential groove 48 formed in the stem of screw 45. Preferably screw 45 is provided at the outer end of its shank with a cross bar 49 secured thereto by welding or in any suitable manner, this cross bar preferably being knurled and providing a handle for convenience in rotating screw 45 and also for rotating the head 26 about sleeve 5. Section 27 of head 26 is provided with a slot 50 opening into bore 46 and plate 43 is adjustable radially of extension or shoulder 23 of liner 17, radial outward movement of plate 43 being limited by contact of element 44 with section 27 of head 26 at the radially outer end of slot 50. The slot 50 is of such length that, in the use of the tool, element 44 of plate 43 does not contact section 27 of head 26 at the radially inner end of slot 50, inward movement of plate 43 being limited by contact thereof with the shoulder or extension 23 of liner 17, as will be explained more fully presently.

A cutter 52, preferably in the form of a cutting disc, is rotatably mounted on the outer face of plate 43 by means of a shouldered cap screw 53 passing through the cutter centrally thereof and threaded into plate 43. The cutter 52 extends radially inward beyond the radially inner end of plate 43 a substantial distance, as shown, and the inner face thereof is flat and disposed approximately in the plane of the outer end of the shoulder or extension 23 of the liner 17 so that the cut to be made through the aluminum covering of the cable end will be in close proximity to shoulder 23 so as to assure a clean cut. The cable having been completely severed or cut through, as and for the reasons above stated, the clamp structure comprising the sleeve 5 and the liner 17 and associated parts is clamped tightly about the cable end with the shoulder 23 spaced a suitable distance, approximately six inches more or less, from the severed end of the cable. The cable C comprises a steel core 54, usually stranded, and a stranded aluminum covering 55 wrapped upon core 54 in a known manner. The cable may vary considerably in diameter, for example, from a diameter of approximately 1¾ inches with a steel core of a diameter of approximately ½ inch to a diameter of approximately ¾ of an inch with a steel core of a diameter of approximately ¼ of an inch. Assuming, for example, that the cable C has a diameter of approximately 1¾ inches and the steel core has a diameter of approximately ½ inch, the thickness of the aluminum covering of the cable would be approximately .6 inch. In cutting the aluminum covering of that cable, the shoulder or extension 23 of the liner 17 would have a radial thickness such that when the radially inner end of plate 43 is in contact with shoulder 23, the cutter disc 52 would extend almost but not quite completely through the aluminum covering, so as to cut through all of the layers of the aluminum strands except the innermost layer, while cutting through the innermost layer to within a slight distance of the core whereby the strands of the innermost layer may readily be broken off. The extension or shoulder 23 of the liner 17 thus cooperates with the plate 43 to guard effectively against the cutter 52 coming into contact with the core 54 and scoring or scratching the latter which, for the reasons above noted, should be avoided. In practice a plurality of liners is provided having extensions or shoulders 23 of different wall thicknesses or radial extent to suit cables of different diameters with different thicknesses of the aluminum covering. The liners are suitably marked to indicate the cables with which they should be used and, as noted, are readily removable from and replaceable in the sleeve 5, which may have an interior diameter adequate to receive liners suitable for use with a cable of the maximum diameter for which the tool is to be used and liners for use with cables of intermediate diameters. By using the proper liners the tool may be used to cut the stranded aluminum covering of any cable within a given range of diameters without risk of injury to the reinforcing steel core.

In the use of the tool in the manner above described, the rod or handle 22 is grasped with one hand and provides means for holding the clamp structure against turning movement, and the cross bar 49 of the screw 48 is grasped with the other hand providing a convenient handle for rotating the cutter head 26 about the end of sleeve 5 and for turning the screw 45 so as to feed the cutter 52 radially inward of the cable as the cutting operation proceeds. Within the broader aspects of my invention, any suitable means may be provided for holding the clamp sleeve 5 against turning movement while performing the cutting operation, and any suitable means may be provided for rotating the cutter head about the sleeve and advancing the cutter inward radially of the cable.

It will be understood that changes in detail may be resorted to without departing from the field and scope of my invention, and I intend to include all such variations, as fall within the scope of the appended claims, in this application in which the preferred form only of my invention has been disclosed.

I claim:

1. In a tool for cutting steel cored stranded aluminum conductor cables, a tubular structure adapted to fit tightly about a cable end to be cut, said structure having at one end a cylindrical extension coaxial therewith, a cutter head rotatably mounted on said one end of said structure, a cutter plate slidably mounted on said head for movement therewith and for relative adjustment radially of said extension, the latter providing a stop limiting inward radial movement of said plate, means for adjusting said plate, and a cutter member carried by said plate projecting radially inward beyond the inner end thereof and movable thereby across and radially inward beyond the outer end of said extension into cutting engagement with the cable end to be cut.

2. In a tool for cutting steel cored stranded aluminum conductor cables, a split clamp sleeve, a split liner removably mounted in said sleeve adapted to fit about a cable end to be cut, said liner having a cylindrical extension projecting beyond one end of said sleeve, means for clamping said sleeve and liner tightly about a cable end, a split cutter head rotatably and removably mounted on said one end of said sleeve, said sleeve and said head having cooperating means restraining the latter against relative movement axially of said sleeve, a cutter plate slidably mounted on the outer side of said head for movement therewith and for relative adjustment radially of said extension, the outer face of said cutter plate being approximately in the plane of the outer end of said extension, the latter providing a stop limiting radial movement of said plate, means for adjusting said plate, and a cutter disc rotatably mounted on said plate and having a flat inner face approximately in the plane of the outer face of said plate, said cutter disc projecting radially inward beyond the inner end of said plate and being movable thereby across and radially inward beyond the outer end of said extension into cutting engagement with the cable end to be cut.

3. In a tool for cutting steel cored stranded aluminum conductor cables, a split clamp sleeve, a split liner removably mounted in said sleeve adapted to fit about a cable end to be cut, said liner having a cylindrical extension projecting beyond one end of said sleeve, means for clamping said sleeve and liner tightly about a cable end, a cutter head rotatably mounted on said one end of said sleeve, a cutter plate slidably mounted on said head for movement therewith and for relative adjustment radially of said extension, the latter providing a stop limiting radial inward movement of said plate, an adjusting screw rotatably mounted in said head restrained against endwise movement and having threaded engagement with said plate for adjusting the latter, said screw projecting outward beyond said head providing a handle for rotating said head about said sleeve, and a cutter disc rotatably mounted on said plate and having a flat inner face approximately in the plane of the outer end of said extension, said cutter disc projecting radially inward beyond the inner end of said plate and being movable thereby across and radially inward beyond the outer end of said extension into cutting engagement with the cable end to be cut.

4. In a tool for cutting steel cored stranded aluminum conductor cables, a split clamp sleeve, a split liner removably mounted in said sleeve adapted to fit about a cable end to be cut, said liner having a cylindrical extension projecting beyond one end of said sleeve, means for clamping said sleeve and liner tightly about a cable end, a cutter head rotatably mounted on said one end of said head, a cutter plate slidably mounted on said head for movement therewith and for relative adjustment radially of said extension, the latter providing a stop limiting radial inward movement of said plate, an adjusting screw rotatably mounted in said head restrained against endwise movement and having threaded engagement with said plate for adjusting the latter, said screw projecting outward beyond said head and having at its outer end a cross bar providing a handle for rotating said screw and for rotating said head about said sleeve, the latter and said liner having cooperating means restraining them against relative axial and turning movements, a handle secured to said sleeve for restraining the latter against turning movement, and a cutter disc rotatably mounted on said plate and having a flat inner face approximately in the plane of the outer end of said extension, said cutter disc projecting radially inward beyond the inner end of said plate and being movable thereby across and radially inward beyond the outer end of said extension into cutting engagement with the cable end to be cut.

References Cited in the file of this patent

UNITED STATES PATENTS

| | | |
|---|---|---|
| 1,178,801 | Griffin | Apr. 11, 1916 |
| 1,629,696 | Goff | May 24, 1927 |
| 2,120,398 | Edwards et al. | June 14, 1938 |
| 2,683,930 | Walters | July 20, 1954 |

UNITED STATES PATENT OFFICE
CERTIFICATE OF CORRECTION

Patent No. 2,735,175                                                        February 21, 1956

John R Tallman

It is hereby certified that error appears in the printed specification of the above numbered patent requiring correction and that the said Letters Patent should read as corrected below.

Column 5, line 18, after "radial" insert —inward—.

Signed and sealed this 17th day of April 1956.

(SEAL)
Attest:
E. J. MURRY

Attesting Officer                                                       ROBERT C. WATSON
                                                                            Commissioner of Patents